United States Patent [19]

May et al.

[11] Patent Number: 5,670,188
[45] Date of Patent: Sep. 23, 1997

[54] APPARATUS FOR SINGLE-SIDED, COLD MECHANICAL KNURLING

[75] Inventors: Daniel R. May, W. Henrietta; Kevin A. Cole, Ontario; Sharon A. Guzman, Kent; John J. Zeller, Rochester, all of N.Y.

[73] Assignee: Eastman Kodak Company, Rochester, N.Y.

[21] Appl. No.: 359,129

[22] Filed: Dec. 19, 1994

[51] Int. Cl.$^6$ .............................. B28B 11/08; B29C 59/04
[52] U.S. Cl. .................... 425/363; 264/280; 264/284; 425/385; 425/394
[58] Field of Search ................... 425/363, 369, 425/383, 385, 394; 264/280, 284

[56] References Cited

U.S. PATENT DOCUMENTS

| | | | |
|---|---|---|---|
| 626,357 | 6/1899 | Whitney | 430/501 |
| 1,037,192 | 9/1912 | Battershall | 430/401 |
| 1,651,744 | 12/1927 | VanDerhoef . | |
| 1,744,829 | 1/1930 | Dreyfus | 8/470 |
| 1,899,688 | 2/1933 | Hill | 264/129 |
| 2,144,263 | 1/1939 | Lane | 93/1 |
| 2,442,567 | 6/1948 | Jesseph | 83/345 |
| 2,639,660 | 5/1953 | Sunderhauf et al. | 101/23 |
| 3,254,148 | 5/1966 | Nichols | 264/284 |
| 3,379,605 | 4/1968 | Nerwin | 428/177 |
| 3,418,925 | 12/1968 | Wiggins | 101/23 |
| 3,502,765 | 3/1970 | Spencer | 264/230 |
| 3,608,047 | 9/1971 | Wiggins | 264/286 |
| 3,983,905 | 10/1976 | Witzig | 138/156 |
| 4,185,068 | 1/1980 | Schmidt et al. | 264/310 |
| 4,234,300 | 11/1980 | Yamagisi et al. | 425/363 |
| 4,247,273 | 1/1981 | Pogrzeba et al. | 425/174.2 |
| 5,156,863 | 10/1992 | Pricone et al. | 425/363 |
| 5,234,802 | 8/1993 | Nakamura et al. | 430/403 |
| 5,238,642 | 8/1993 | Benquet et al. | 264/284 |

FOREIGN PATENT DOCUMENTS

| | | | |
|---|---|---|---|
| 0008362 | 7/1979 | European Pat. Off. . | |
| 0580523A1 | 6/1993 | European Pat. Off. . | |
| 868690 | 2/1953 | Germany | |
| 50-5229 | 3/1975 | Japan | 425/369 |
| 63074850 | 5/1988 | Japan . | |
| 1102042 | 2/1968 | United Kingdom | 425/369 |
| 2040792A | 1/1980 | United Kingdom . | |
| 2104847A | 8/1982 | United Kingdom . | |

*Primary Examiner*—Jan H. Silbaugh
*Assistant Examiner*—Mark Eashoo
*Attorney, Agent, or Firm*—Carl F. Ruoff; Mark G. Bocchetti

[57] ABSTRACT

An apparatus for producing single-sided knurls on a web or substrate without heat. The apparatus includes a conventional knurling wheel and a knurling wheel having its points ground down. A nip is formed by these two wheels and an edge of the web is passed through the nip. The resulting knurl has raised features on only one side of the web. The knurls are thinner than conventional two sided knurls and minimize fluting to the web.

5 Claims, 10 Drawing Sheets

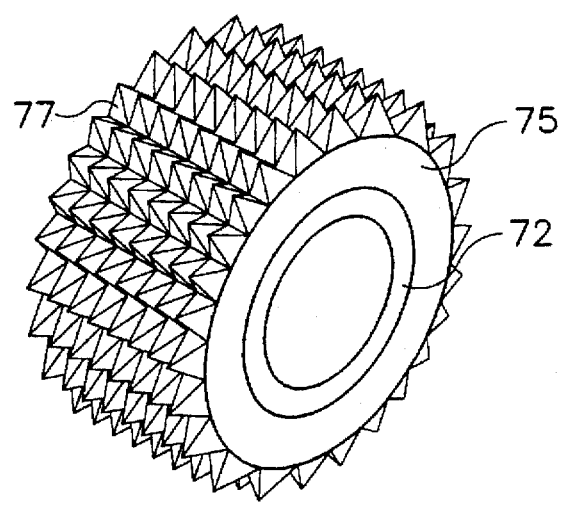
FIG. 12
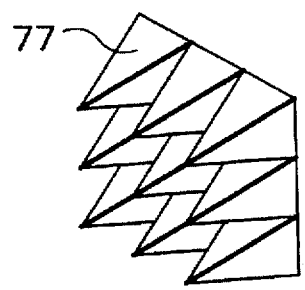
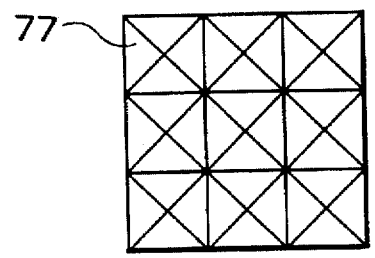
FIG. 13A     FIG. 13B
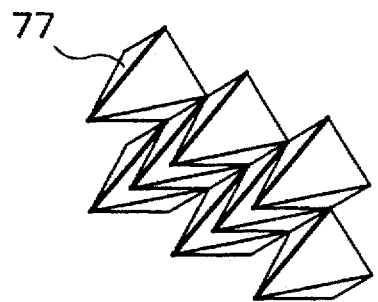
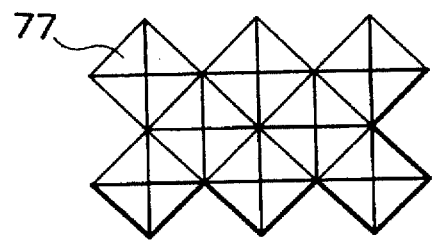
FIG. 14A     FIG. 14B

APPARATUS FOR SINGLE-SIDED, COLD MECHANICAL KNURLING

FIELD OF THE INVENTION

The present invention relates to an apparatus for thickening the edges of a film support to facilitate handling of the film. More particularly, the present invention provides a process for single sided, cold mechanical knurling.

BACKGROUND OF THE INVENTION

Knurling is the process whereby the edges of a film support are thickened so that when the support is wound into a roll, most of the pressure will be in the knurled region. This accomplishes two things: it helps prevent hard streaks due to support thickness variation in the body of the roll; and it helps hold the roll together during winding and unwinding in subsequent manufacturing operations. Prior art techniques include running the edges of the film support between two wheels that have teeth, causing plastic deformation of the support material. FIGS. 1–3 show a typical knurl wheel and the typical process that produces a two sided knurl. As seen in FIG. 3, the two sided or conventional knurl consists of alternating humps and divots on each side of the web. Each tooth of the wheel pushes the material to the opposite side of the web. This technique is described in U.S. Pat. No. 1,651,744.

Other techniques of knurling include the use of heated wheels with teeth on one or both of the knurl wheels. The present invention does not use any form of heating to form knurling features.

One consequence of making a roll with knurled edges is that in winding the roll, the support has wavy edges. This is also referred to as fluting or as wavy pleats. There are a number of patents that discuss the use of heat to remove and/or prevent this fluting. Some of these include U.S. Pat. NOS. 3,502,765; 4,185,068 and 4,234,300. Fluting often extends into the coated section of film support and impacts the slitting and perforation of the outside edges of the web. The knurls of the present invention help to minimize the impact of fluting on the usable portion of the film support.

Fluting also impacts sensitizing operations. There is a strong need to be able to coat film emulsions into the knurled edge of the web. The outside edges of the coating cannot be sold due to the bad sensitometry, the knurls cannot be sold because of the physical distortion they create. By overlapping the bad sensitometry section of the coating and the knurled region, less film base material needs to be made because the web can be made narrower. This helps reduce material costs. Currently, the knurls and the coating are not in the same region. There are many reasons for this: severe flutes can hit the hopper lip which cause smears and rubs; fluting may cause the coatings to splash when they are applied; the coating may flow along the flutes before it dries; and the flutes can change the drying characteristics of the coating.

The knurls produced in the present invention create a fluting pattern that better allows for coating onto the knurled region of the film support and provides a side of the web that is free from knurled features.

BRIEF DESCRIPTION OF THE DRAWINGS

FIG. 12 shows a perspective view of a standard knurl wheel.

FIG. 13 shows knurl features of the knurl wheel shown in FIG. 12 parallel to the wheel axis in an oblique view and a top view.

FIG. 14 shows knurl features of the knurl wheel shown in FIG. 12 at a 45° angle to the wheel axis in an oblique view and a top view.

For better understanding of the present invention together with other objects, advantages, and capabilities thereof, references made the following description and appended claims in connection with the above described drawings.

SUMMARY OF THE INVENTION

The present invention is an apparatus and method for knurling an edge of a deformable web, the web having a top side and a bottom side. A first roller having an outer circumference, the outer circumference having teeth is provided. A second roller having an outer circumference, the outer circumference having ground teeth creating plateaus and valleys is also provided. The first and second rollers are aligned to form a nip wherein the teeth of the first roller align with the valleys between the plateaus of the second roller, the first and second rollers are not heated. The edge of the deformable web is moved through the nip wherein the second roller contacts the top side of the web and the first roller contacts the bottom side of the web wherein the web is embossed on the top side and the bottom side is minimally embossed.

The present invention produces a web material having knurls on one side of the web. This is advantageous in that it allows coating of the knurl region web and minimizes fluting of the web.

DESCRIPTION OF THE PREFERRED EMBODIMENTS

Many of the patents discussed earlier state that fluting or wavy pleats are due to the stretching of the film support during the knurling process. However it has been found that this is not entirely true. Most of the fluting occurs when the roll is wound. The knurled edges of the roll are larger in diameter than the smooth center section of the roll. The knurled section of the wound roll is known as the knurl tire. It is the stretching that occurs in the knurl tire that produces most of the fluting. Thus, a thinner knurl produces a smaller knurl tire, which in turn results in less fluting. The knurl process and apparatus disclosed herein allows a thinner knurl to be used. The understanding that the fluting is due to the knurl tire and not the knurling process, and that a thinner knurl will result in less fluting are two of the novel features of this invention.

Figure 1:
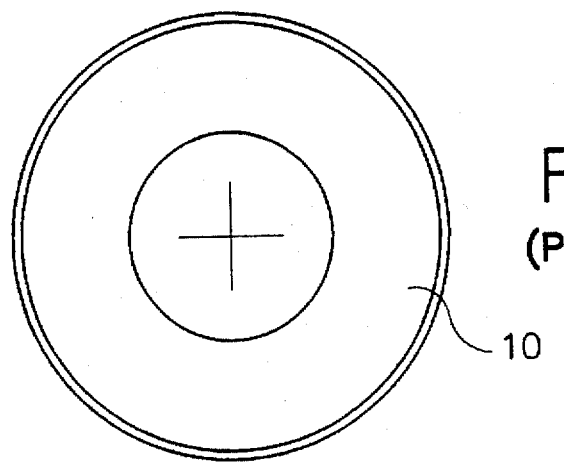
FIG. 1 shows a knurl wheel of the prior art.
Figure 2:
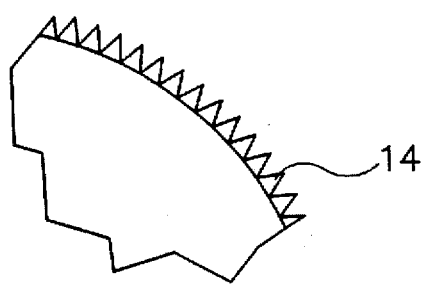
FIG. 2 is an expanded view of the teeth of the knurl wheel of FIG. 1.
Figure 3:
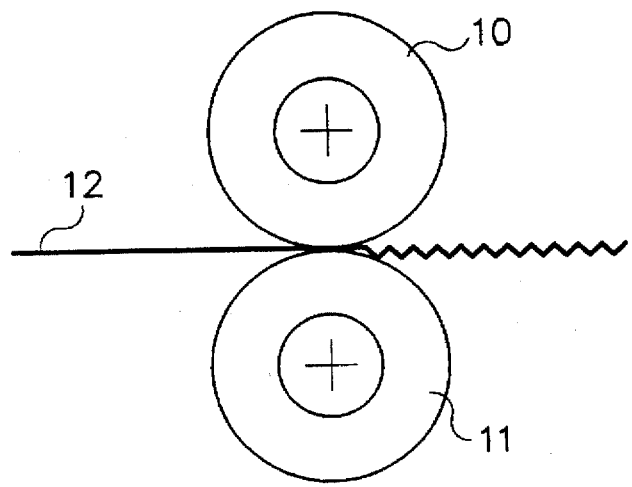
FIG. 3 shows a schematic of the knurling process using prior art knurling wheels.
Figure 4:
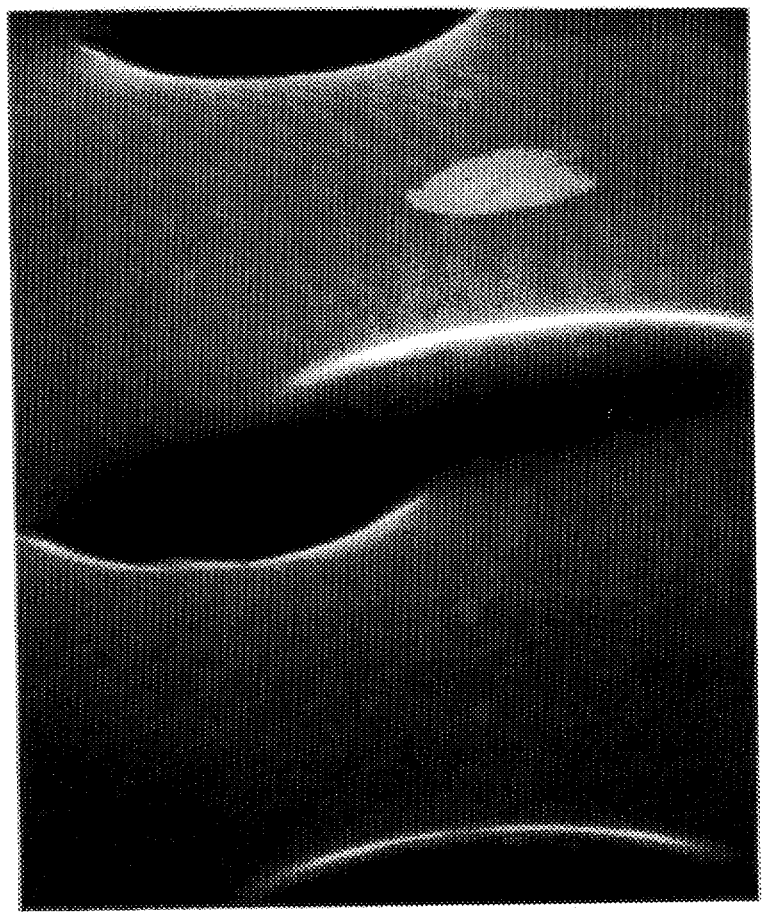
FIG. 4 is a photograph of a typical two sided knurl.

The knurling process described in the present application does not use heat. Rather it is a cold process that relies on changes made to the knurl wheels. In FIG. 1 a prior art knurl wheel is shown. FIG. 2 shows an expanded view of the teeth 14 of the knurl wheel of FIG. 1. FIG. 3 shows two knurling wheels 10 and 11 and the knurling process which produces the knurled edges on a substrate 12. The web 12 is passed through the nip formed by knurling wheels 10 and 11 and the edge of the web has raised features on both sides as shown in FIG. 3. FIG. 4 is a photograph of a typical two sided knurl that has both up features and down features.

Figure 5:
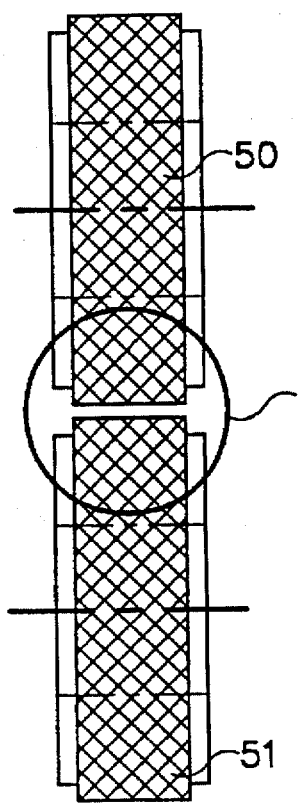
FIG. 5 shows two knurl wheels forming a nip.
Figure 6:
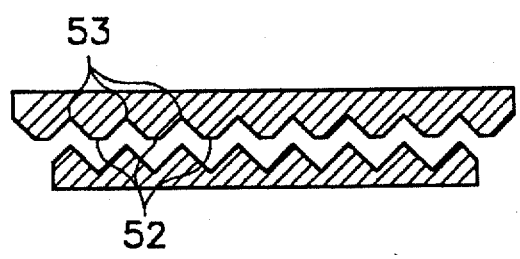
FIG. 6 shows the knurl wheels used in the present invention for making single sided cold mechanical knurls.
Figure 7:
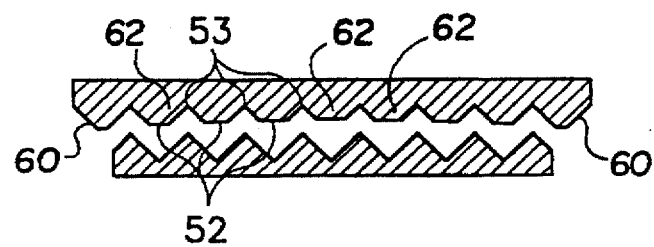
FIG. 7 shows an alternate embodiment of the knurl wheels of the present invention.
Figure 8A:
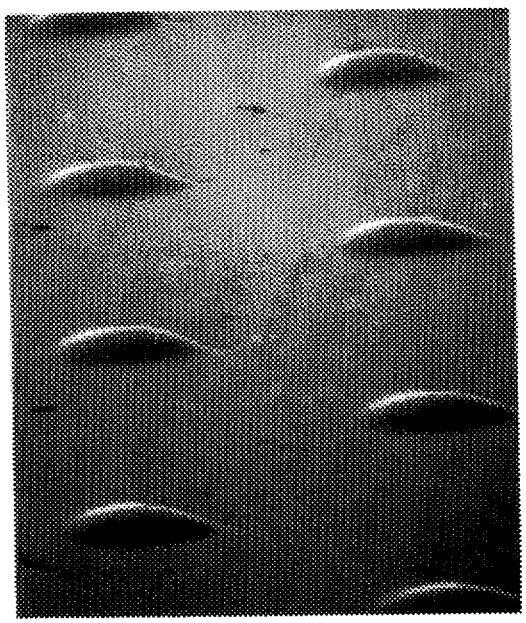
FIG. 8A shows the up features of the knurls formed by the present invention and FIG. 8B shows the down features of the knurls formed by the present invention.
Figure 8B:
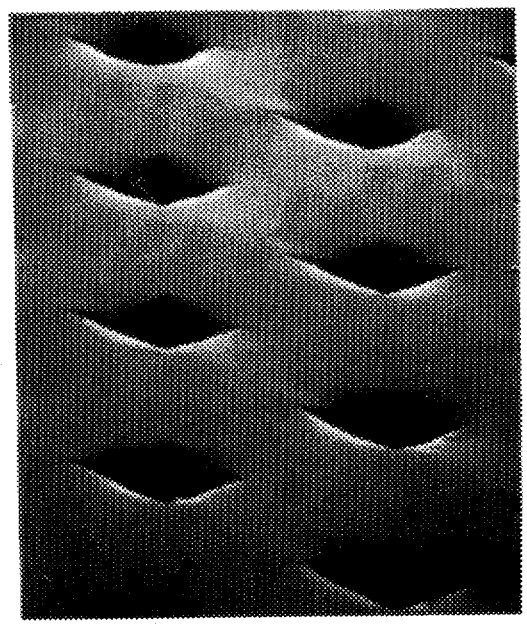

FIGS. 5–7 show a schematic of the present invention. Two knurl wheels 50 and 51 are used that originally have pyramidal points or teeth on them. As shown in the expanded view of FIG. 5 (FIGS. 6 and 7), one of the wheels 50 has the points ground off, creating a series of valleys 53 and plateaus 52. When the teeth are truncated by grinding they can either have a straight profile as shown in FIG. 6 or a curved profile as shown in FIG. 7. When the wheels mesh together, the plateaus are load bearing and do not dig into the substrate, only the pointed teeth on wheel 51 push through. As a result the knurl formed has humps on one side and impressions or divots on the other side of the substrate. The humps or up features, are the part of the knurl that actually thicken the film. The divots do not have any affect on the thickness of the film. FIGS. 8A and B show pictures of both the humps (FIG. 8A) and the divots (FIG. 8B).

The profiled knurl wheel shown in FIG. 7 differs slightly from the straight knurl wheel shown in FIG. 6 in that the profiled wheel features are ground down more in the center than at the edges of the wheel. As a result, the curved knurl is shallower in the middle and thicker at the edges than the straight knurl A1 & B1. It is thought that this type of knurl may produce less fluting than a straight knurl. It has been shown that both knurls described above produce less fluting than prior art two sided knurls using cellulose triacetate. Another feature of the present invention is that the shallower knurl tire in the center allows the coating bead or the edge of the coating, which is often thicker than the rest of the coating, to rest in this region and not create a thicker region. Often times, the coating bead is thick enough that the bead creates a hard streak when it winds, if the hard streak is thick enough, the roll will actually wind on the hard streak instead of the knurl, causing an unstable wound roll. The profiled knurl helps to reduce the hard streaks and allows the roll to wind better.

Figure 9:
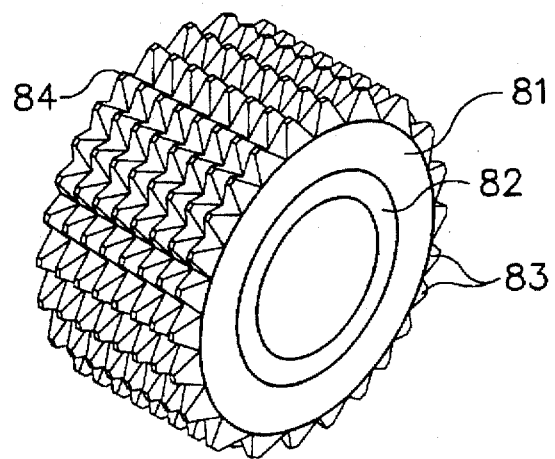
FIG. 9 shows a perspective view of a flat topped knurl wheel of the present invention.

FIG. 9 shows one embodiment of the present invention. It shows a knurl wheel 81 with an inner diameter such that a rolling bearing 82 fits tightly within it. The outer diameter of wheel 81 is covered by features 83 that include square bases and square tops 84 with trapezoidal cross sections i.e., four sided pyramids with the tops ground off. This wheel is mated with a knurl wheel shown in FIGS. 12–14. The mating wheel includes a metal wheel 75 with an inner diameter such that a roller bearing 72 fits tightly within it. The outer diameter of wheel 75 is covered by teeth 77 that are four sided pyramids. A nip is formed between wheels 75 and 81 and the substrate is passed through the nip. The substrate can be of any thickness. As the support moves through the nip created by the wheels 75 and 81, the wheels turn freely on their bearings 72 and 82. The ground teeth of wheel 81 which have flat tops create load bearing plateaus 85 (see FIGS. 10 and 11) for the substrate. The teeth 77 push the plastic deformable material of the substrate into the gaps between the plateaus 85 of wheel 81, plastically stretching and deforming the support material. The support material thus has humps of equal height formed on the same side as wheel 81 and divots left on the same side as wheel 75.

Figure 15:
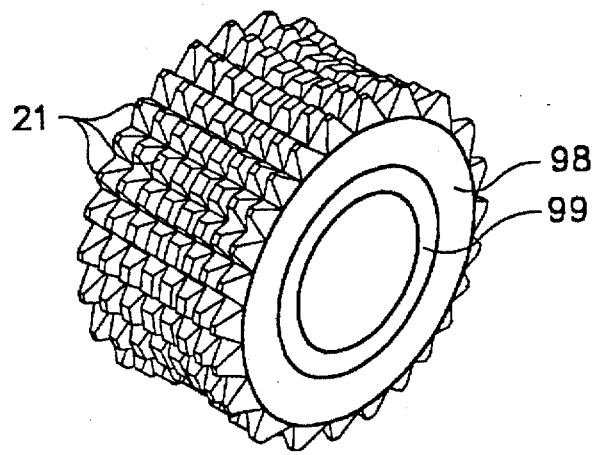
FIG. 15 shows a perspective view of a profiled knurl wheel.
Figure 16:
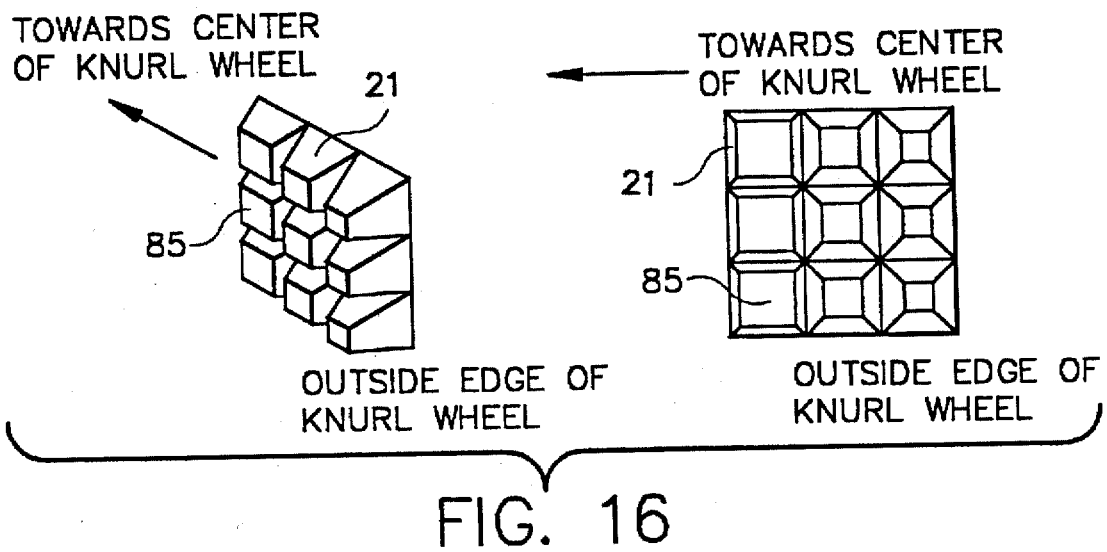
FIG. 16 shows the knurl features of the knurl wheel shown in FIG. 15 parallel to the wheel axis in an oblique view and a top view.
Figure 17:
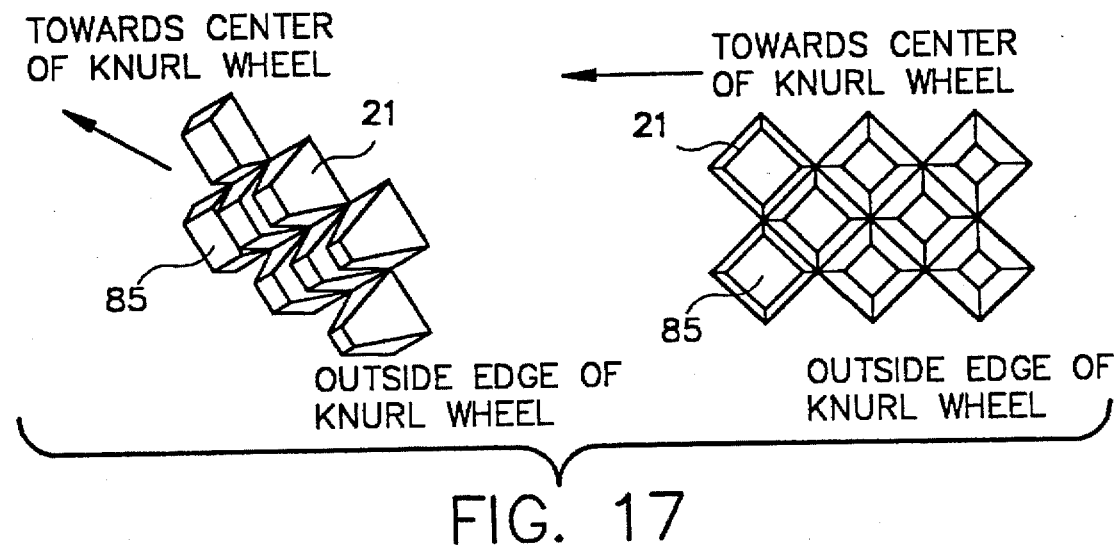
FIG. 17 shows the knurl features of the knurl wheel shown in FIG. 15 at a 45° angle to the wheel axis in an oblique view and a top view.

An alternate embodiment of the invention is shown in FIGS. 15–17 which shows a knurl wheel similar to wheel 81. The knurl wheel 98 includes a roller bearing 99 fitted tightly into an inner diameter of the wheel 98. The ground down or truncated pyramidal teeth shown generally as 21 are such that the tops 85 lie on a curved surface. Therefore the features in the center of the wheel lie in a lower plane than the features on the outer edges. Plastic support is placed between a nip formed by wheels 98 and 75. The plateaus 85 are load bearing. The teeth of wheel 75 push the plastic material into the gaps between the plateaus 85, plastically stretching and deforming the support material. The support material thus has humps of unequal heights formed on the same side as wheel 98, with higher knurl features at the edges and the lowest humps at the center. Divots of varying depth are left on the same side as wheel 75.

It should be noted that the descriptions of the two embodiments of the two inventions are the preferred designs, but other designs are possible. The main requirements are that the wheels 81 and 98 must contain features that have blunt tops or plateaus. These could be cones with the points removed, cubes, or upstanding cylinders. The size of the plateau is important; if the plateau is too narrow, the knurls produced will be two sided; if the plateaus are too wide, too much force may be required to produce the desired knurl thickness and the web or substrate could fracture. The other requirement is that the wheel 75 has features on its surface that have pointed ends such as cones, three sided pyramids, or corner cubes. The height of the pointed ends must be greater than the base width, i.e. an aspect ratio of greater than 1. These features could all be made by various machining or etching processes. The preferred features were chosen because of the ease and the low cost of manufacturability.

Figure 10A:
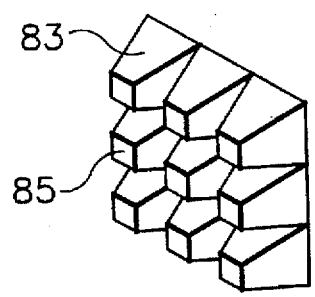
FIG. 10 shows the knurl features of the knurl wheel shown in FIG. 9 parallel to the wheel axis in an oblique view and a top view.
Figure 10B:
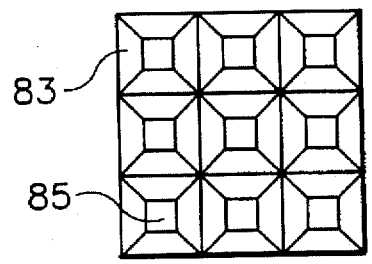
Figure 11A:
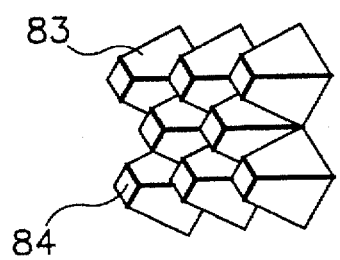
FIG. 11 shows the knurl features of the knurl wheel shown in FIG. 9 at a 45° angle to the wheel axis in an oblique view and a top view.
Figure 11B:
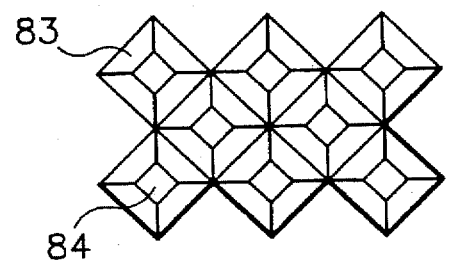
Figure 18:
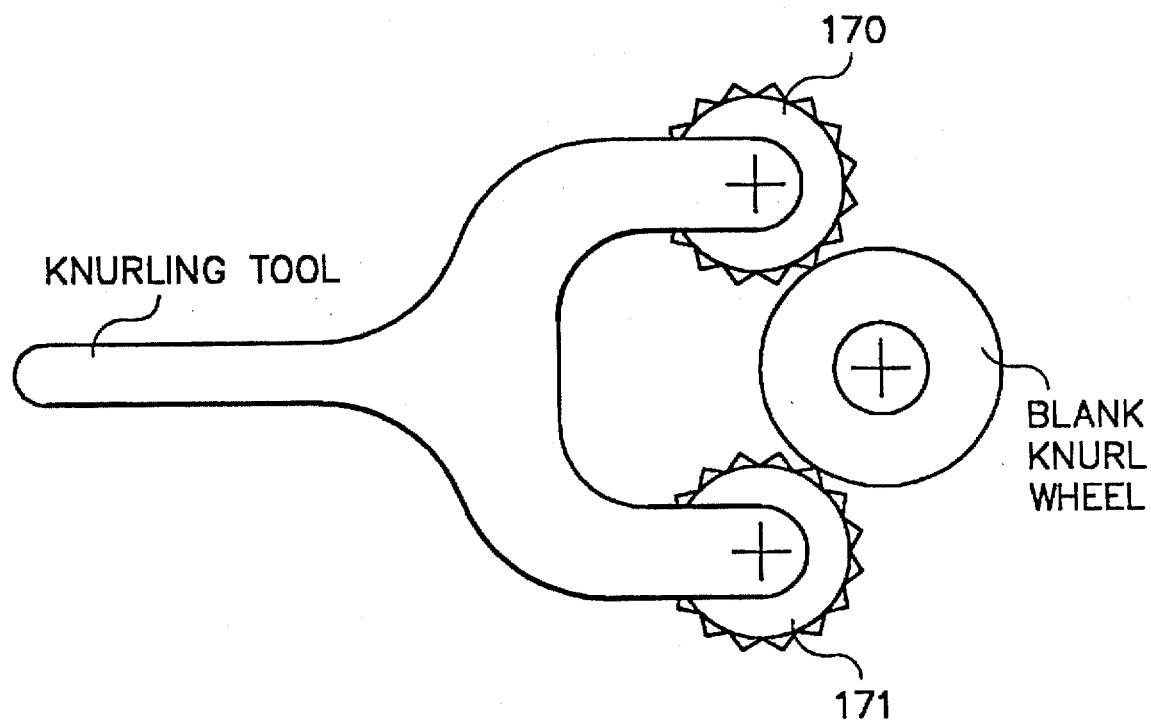
FIG. 18 shows a schematic diagram of a knurling tool.
Figure 19A:
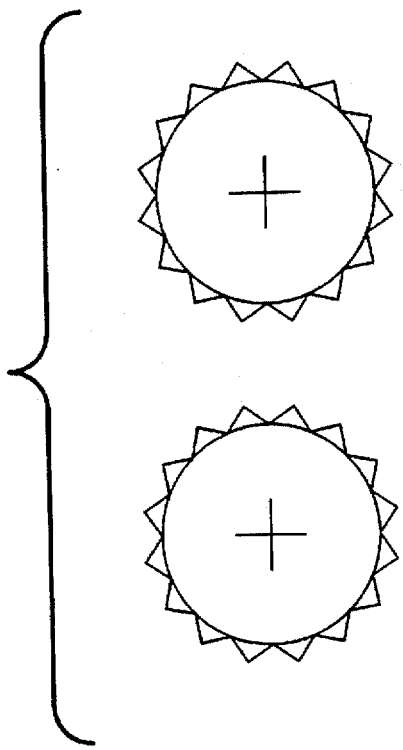
FIG. 19 shows a schematic of forming wheels for making knurls in an end view and a side view.
Figure 19B:
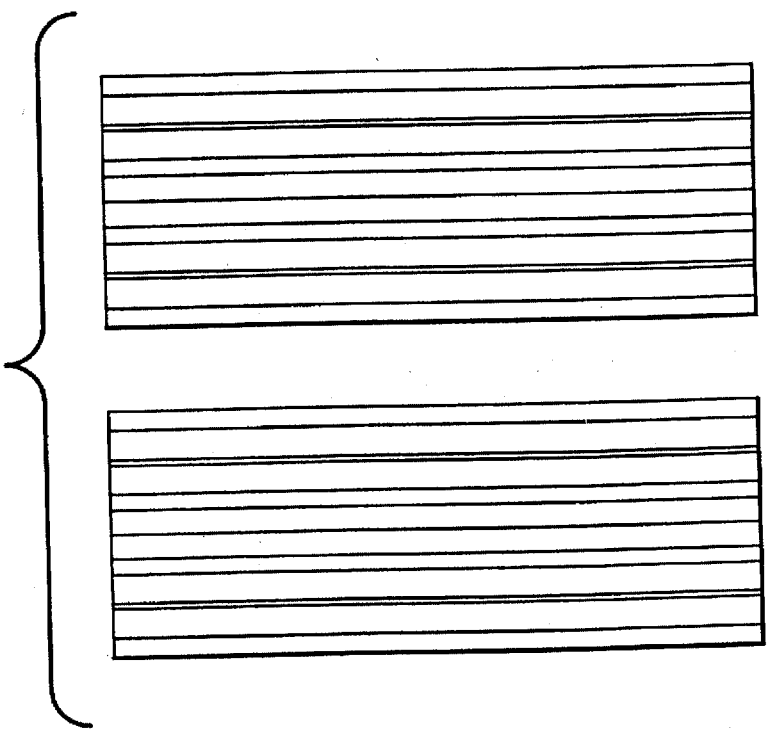
Figure 20A:
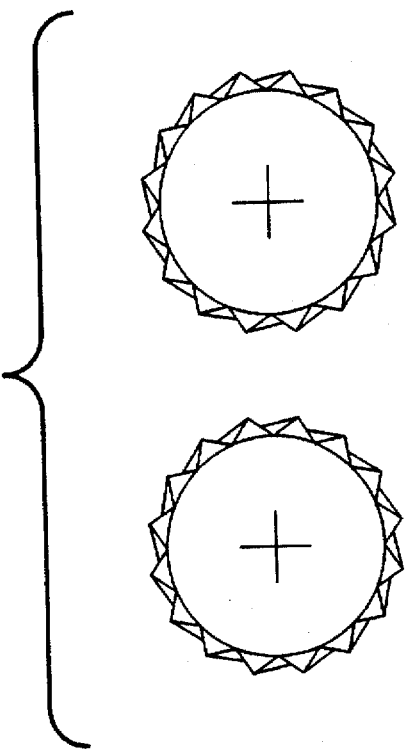
FIG. 20 shows a schematic of forming wheels for making knurls at 45° angle to the wheel axis in an end view and a side view.
Figure 20B:
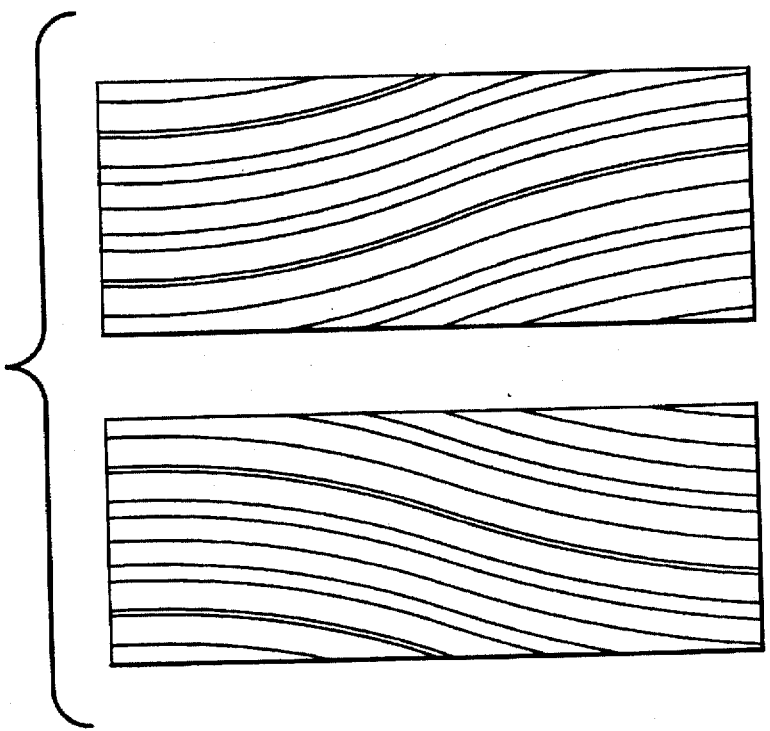

The initial knurl wheels shown in FIGS. 9–11 are made using standard machinery techniques. First a blank wheel is machined to the correct inner and outer diameters, usually on a lathe. Next the wheel is placed in contact with a standard knurling tool shown in FIG. 18. The tool includes a pair of forming wheels 170 and 171 that have triangular cross sectional teeth on them. If the final teeth on the knurl wheel are to be in straight rows, parallel to the axis of the wheel, the forming teeth are straight and parallel to the axis of the cutting wheel as shown in FIG. 19. If the knurl teeth are to be cut at an angle, such as 45° to the axis of the knurl wheel, then the teeth of the forming wheel are helical in shape, with a helixes in opposite directions. This is shown in FIG. 20. The present invention can be manufactured at any angle, although 0 and 45 degrees are the preferred orientations. The forming wheels are held against the blank knurl wheel as the blank knurl wheel is rotated in the lathe. The forming wheel teeth act like miniature plows, they simultaneously push metal below the surface of the wheel and push metal up away from the surface of the wheel, thus creating rows of features. The pyramids are formed when the second forming wheel crosses over these rows at an angle of 90°. The number of pyramidal teeth formed per square inch is dependent upon the pitch of the teeth of the forming wheels on the knurling tool. Any skilled machinist knows how to make the initial knurl wheels.

The invention is created in the next machining step. One of knurl wheels remains in the lathe or is placed on a grinder and the pyramidal teeth are cut down. The preferred embodiment of the invention is to use a grinding wheel for this operation. The amount the teeth are ground down is dependent upon the number of teeth per inch, or the number of teeth per square inch, the original height of the teeth, the desired height of the knurls on the web, the web material and the web thickness. The invention includes all possible combinations of the aforementioned parameters such that the stiffness of the subsequently created knurl features give satisfactory winding performance and fluting characteristics.

EXAMPLE 1

Knurl wheels were created which have teeth formed at a 45° angle and spaced at 24 teeth per inch (9.45 teeth per centimeter). The support knurled was approximately 0.005 inches thick and approximately 0.001 inch height above the web surface. The height of each tooth was 0.0255 inches. The amount of material removed as measured from the top of the teeth can range from between 0.006 and 0.015 inches, with the preferred range being between 0.008 and 0.013 inches.

For the profiled knurl wheel, the preferred method of manufacture is to grind the teeth with a grinding wheel of a specific radius. In this case the amount of material removed is dependent upon the same variables as for the straight knurl plus the width of the entire knurl pattern and the height of the coated edge bead. The invention includes all possible combinations of the aforementioned parameters such that the stiffness of the subsequently created knurl features give satisfactory winding and fluting characteristics.

EXAMPLE 2

The knurl wheels have teeth formed at a 45° angle and spaced at 24 teeth per inch, 9.45 teeth per centimeter. The height of each tooth is 0.0255 inches. The support hurled was approximately 0.005 inches thick and the stiffness in the knurled region was equivalent to the stiffness of the straight knurl in the previous example. For this example, a grinding wheel with an 11 inch radius is used to grind the teeth of the hurling wheel. It should be plunged to a depth whereby the material removed from the teeth along the edge of the pattern have at least 0.008 inches of material removed from their peaks.

Roller bearings are pressed into the inner diameters of the knurl wheels and then mounted onto parallel shafts. These shafts, in turn are mounted in metal housing containing an air or hydraulic cylinder or any other means for generating force. The knurl wheel with the straight or curved profile is placed on the side of the web on which the raised knurl features are desired. The knurl wheel with the pyramidal points intact is placed on the opposing side. The metal housing should allow for various alignment capabilities between the wheels and between the wheels and the web for the purpose of the initial set up. If the gap between the knurl wheels is not fixed, then the force, by the air or hydraulic pressure should be adjusted until the desired knurl height has been achieved. If the gap is to be fixed, the gap corresponding to the desired knurl height must be set.

Data shows that the single sided knurl created by using the knurl wheel of the present invention creates less fluting and a different fluting shape than current conventional knurls. This has the following benefits.

A smaller single sided knurl height can achieve the same performance as a higher conventional knurl. Since the knurl height is related to fluting, this means less fluting for the single sided knurl, without sacrificing the wound roll stability.

The fluting that does exist in the single sided knurl formed using the present invention is of a longer wavelength and a higher amplitude than conventional knurls. This type of fluting is better for coating. The knurls lie flatter going over a coating roll than conventional knurls. This means less distortion of the coating bead and less potential for coatings to splash. There is also less chance that the web will hit the coating station.

The knurl lies flatter in the free spans between rollers. This means that the coating is less likely to flow before it dries.

The up features are only on one side of the film, not both. Coating can be put on the opposite side, i.e. the side where there are divots rather than up features.

The present invention requires only the modification of one of the two knurl wheels. The advantages of this knurling process are the same as those stated in many of the one sided heated knurl patents, but the present invention is purely mechanical and more cost effective to implement than heated processes. Moreover, it is preferred that the knurl wheels of the present invention have teeth on the outer circumference at a linear density of 7–40 teeth/cm.

Initial production trials have shown that webs with single sided knurls convey better. Data has been gathered on lateral motion (weave) and suggests that web with the single surface knurls exhibits less weave than the two sided knurls.

The thickness of the single sided knurls made with the present invention is much easier to control than the thickness of two sided knurls, especially in a system where the nip between the two knurl wheels is not constant. The single sided knurls are less sensitive to variations and pressure than the two sided knurls. A small change in pressure, such as 1 psi can change the thickness of a single sided knurl by 0.0001 to 0.002 inches. That same change in pressure could change the thickness of a two sided knurl by 0.001 inches, an order of magnitude greater than single sided knurls. Thus, the equipment set up is easier and the process is more controllable for the single sided knurls.

While there has been shown and described what are presently considered to be the preferred embodiments of the invention, it will be obvious to those skilled in the art, the various changes and modifications can be made therein without departing from the scope of the claimed invention as defined by the appended claims.

What is claimed is:

1. An apparatus for hurling the edges of a film support web, said apparatus comprising:

(a) a first knurl wheel, said first knurl wheel having a plurality of teeth extending therefrom, each of said plurality of teeth terminating at an apex;

(b) a second knurl wheel forming a nip with said first knurl wheel, said second knurl wheel having a pair of side edges and a center between said side edges, said second knurl wheel having a plurality of truncated teeth extending therefrom, each of said truncated teeth terminating at a plateau, said truncated teeth proximate said center having a reduced height relative to said truncated teeth proximate said side edges, said plateaus forming a cicumferential depression on said second knurl wheel.

2. An apparatus as recited in claim 1 wherein:

said plateaus of said truncated teeth form a curved profile across said second knurl wheel.

3. An apparatus as recited in claim 2 wherein:

said circumferential depression is concave in cross section.

4. An apparatus as recited in claim 2 wherein:

said circumferential depression is arcuate in cross section.

5. An apparatus for knurling the edges of a film support web, said apparatus comprising:

(a) a first knurl wheel, said first knurl wheel having a plurality of teeth extending therefrom, each of said plurality of teeth terminating at an apex;

(b) a second knurl wheel, said second knurl wheel forming a nip with said first knurl wheel, said second knurl wheel having a plurality of circumferential rows of truncated teeth extending therefrom, each of said truncated teeth terminating at a plateau, said truncated teeth residing in said intermediate rows having a reduced height relative to said truncated teeth residing in said circumferential end rows, said plateaus forming an annular depression about the circumference of said second knurl wheel.

* * * * *

UNITED STATES PATENT AND TRADEMARK OFFICE
CERTIFICATE OF CORRECTION

PATENT NO.: 5,670,188
DATED: September 23, 1997
INVENTOR(S): Daniel R. May, et al It is certified that an error appears in the above-identified patent and that said Letters Patent is hereby corrected as shown below:

At column 6, line 63, please remove [hurling] and insert in place thereof knurling.

Signed and Sealed this

Seventeenth Day of March, 1998

*Attest:*

BRUCE LEHMAN

*Attesting Officer*              *Commissioner of Patents and Trademarks*